Patented June 27, 1944

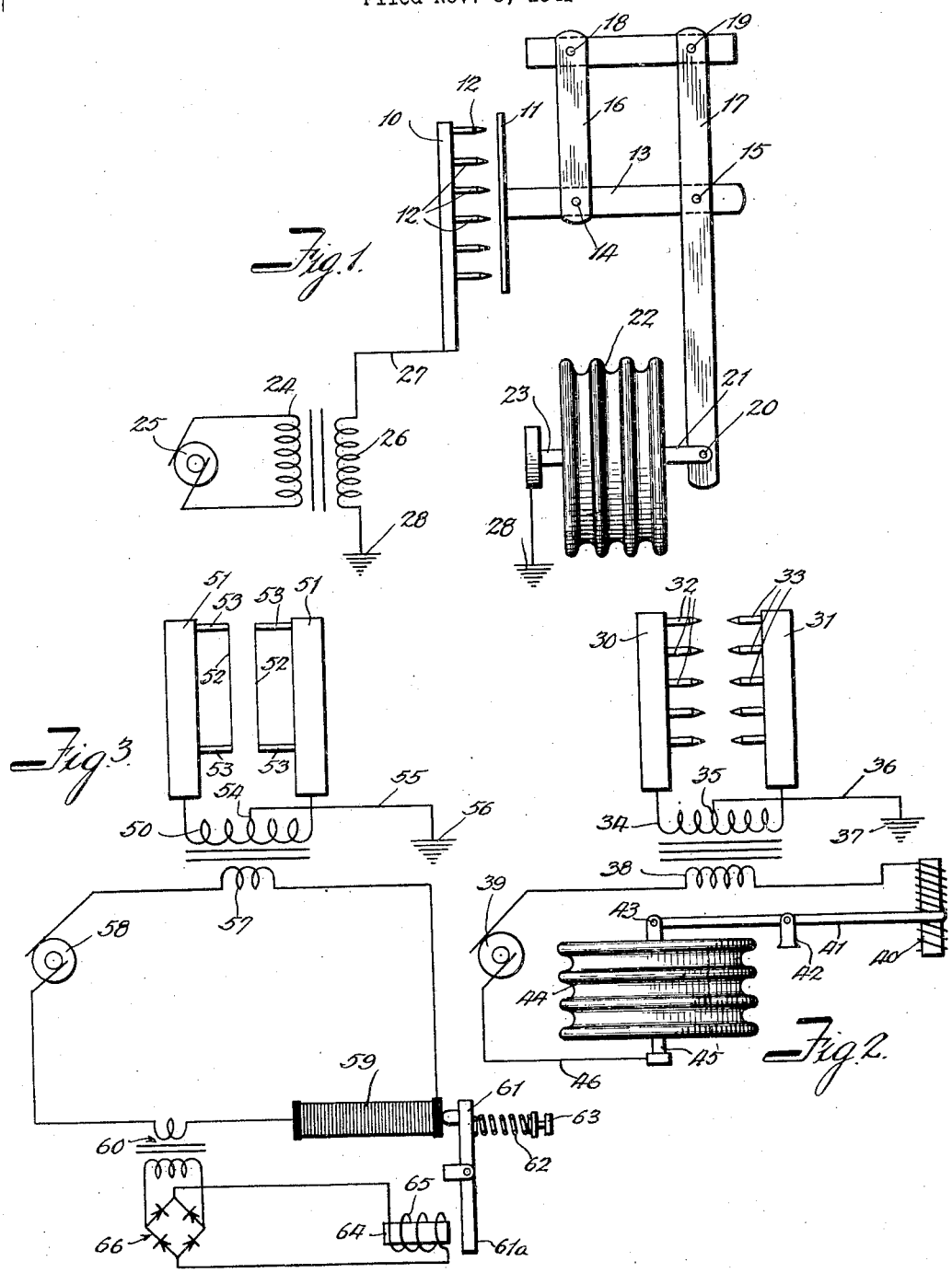

2,352,411

UNITED STATES PATENT OFFICE 2,352,411

STATIC SUPPRESSOR

Peter C. Sandretto, Chicago, Ill., assignor to United Air Lines, Inc., a corporation of Delaware Application November 6, 1941, Serial No. 418,039

20 Claims. (Cl. 175—264)

This invention relates to static suppressors, more particularly to means associated with a body subjected to varying static charges, such as an airplane in flight, for suppressing or preventing disruptive static discharges therefrom of a character which will interfere with radio reception, and the invention has for an object the provision of improved, reliable and inexpensive means of this character.

It is of course well known that airplanes in flight are subjected to constantly varying charges of static electricity of different magnitudes and polarities which may accumulate thereon and eventually result in disruptive discharges from various points on the plane, causing disturbances in the radio receiver of the plane. In fact, when the plane is flying in the vicinity of thunder storm areas or in certain areas of precipitation, static discharge may result of such severity and frequency as to make radio reception virtually impossible. Heretofore proposed solutions of this static problem, as applied to radio reception on a plane, included the expedient of attaching to the plane a device having a greater discharge efficiency than any other point on the plane. For example, a trailing wire of small diameter may be used, or the plane may be provided with discharge points to which high discharge efficiency has been imparted by applying to the points radium, a high voltage, or a high radio frequency.

In devices of the high voltage type, the discharge points form one side of an air gap across which the high voltage is impressed so as to create a voltage gradient across the gap of sufficient magnitude to cause the formation, about the discharge points, of a soft corona glow. Since the discharge points are electrically connected to the body of the plane, static charges accumulating on the plane will flow to the discharge points and be rapidly dissipated in the soft corona glow. In order to prevent disruptive discharges which would interfere with radio reception, it is imperative that the high voltage applied across the air gap be insufficient to create such a potential gradient as would cause the gap to break down and permit disruptive discharge across the gap.

As is well known, the soft corona glow formed on the discharge points is a function of the ionization of the air adjacent the discharge points, and the ionization is of course a function of the mean free path of the electrons in the air, or, in other words, a function of the air density or pressure. It has been found that as an airplane changes altitude in flight, the barometric pressure, and consequently the density of the air adjacent the discharge points, varies to the extent that when a sufficiently high altitude is reached the corona glow about the discharge points will have increased due to increased ionization of the air until it extends entirely across the gap, whereupon breakdown of the gap and harmful disruptive discharges will occur of such a character as to cause disturbances in the radio equipment. It is a further object of this invention to provide a static discharge suppressor of the high voltage type which is effective to maintain the desired soft corona glow at the discharge points for all values of barometric pressure, so as to insure proper suppression of harmful static discharges during the entire flight of a plane.

In carrying out the invention in one form, a pair of discharge grids or elements are provided spaced apart to form an air gap connected across a suitable source of high voltage for producing the desired soft corona glow, a portion of the high voltage circuit being connected to the body of the plane so that static charges accumulating thereon may flow to the discharge points, and automatic means are provided for varying the potential gradient across the air gap in accordance with changes in the barometric pressure as the airplane changes altitude during flight, so as to maintain the soft corona glow while preventing such an increase in the ionization of the air gap as to result in disruptive discharges thereacross. In one embodiment of the invention, the potential gradient may automatically be controlled by utilizing a pressure-responsive device arranged to vary either the length of the air gap or the magnitude of the voltage impressed thereacross so as to maintain the effective potential gradient at the desired value. Other automatic control means which may be employed in carrying out the invention include the use of a constant current circuit for energizing the discharge points, which constant current circuit will prevent any such increase in the current flow as to cause a disruptive discharge while at the same time maintaining a sufficient current flow to produce the desired soft corona glow.

For a more complete understanding of this invention, reference should now be had to the drawing in which:

Fig. 1 is a diagrammatic illustration of one form of static suppressor embodying this invention;

Fig. 2 is a similar diagrammatic view of another modification of the invention utilizing similar pressure-responsive means; and Fig. 3 is a similar diagrammatic view of a still further embodiment of the invention, wherein the pressure-responsive means is in the form of a constant current circuit.

Referring first to Fig. 1 of the drawing, the invention is shown as applied to a static suppressor comprising a pair of discharge grids or elements 10 and 11, the discharge grid 10 being provided with a plurality of sharp points 12 of high discharge efficiency, and the discharge element 11 being in the form of a flat conducting plate spaced from the element 10 to provide an air gap therebetween and to form a suitable target for the discharge points 12.

The discharge element or grid 10 is preferably fixedly mounted in any suitable manner relative to the body of the airplane, and the discharge element or target 11 is mounted as shown on a movable rod or lever 13 supported at the pivot points 14 and 15 on a pair of swinging levers 16 and 17, these latter levers in turn being pivotally supported on suitable fixed pins 18 and 19, respectively. At its lower end the swinging lever 17 is pivotally connected by means of a pivot pin 20 to a suitable stud or arm 21 carried by the movable end of an expansible bellows member 22, the other end of which is mounted on a fixed pin or similar support 23. In order to establish the desired potential gradient across the air gap between the elements 10 and 11, a source of high voltage alternating current energy is provided comprising a transformer having a primary winding 24, which is connected for energization from a suitable alternator 25, and a secondary winding 26 one side of which is connected by a conductor 27 to the discharge element 10, the other side of the transformer winding 26 being connected to the body of the plane as indicated by the ground connection 28.

In order to complete the circuit of the secondary winding 26 the support 23 is likewise connected to the body of the plane, as similarly illustrated by a ground connection, and it will of course be understood that the levers 13 and 17 and the portions 21, 22, and 23 of the expansible bellows are formed of conducting material so as to electrically connect the discharge element or target 11 to the opposite side of the secondary winding 26, whereby the terminal voltage of the transformer secondary winding is impressed across the air gap. It will of course be understood that if it is not convenient to form the levers 13 and 17 of conducting material, the target 11 may be electrically connected directly to the body of the plane through any suitable flexible connection.

It will now be apparent that expansion and contraction of the expansible bellows 22 will be effective through the connecting levers 21, 17, and 13 to effect movement of the target 11 toward and away from the discharge points 12 on the discharge element 10, thus to vary the length of the air gap between the elements 10 and 11. The bellows 22 is of the type in which any decrease in the barometric pressure will result in expansion of the bellows so as to move the target 11 away from the discharge points 12.

In the operation of the static suppressor illustrated in Fig. 1, the terminal voltage of the secondary winding 26 and the spacing of the discharge members 10 and 11 are initially adjusted so that, with the bellows 22 subjected to any given atmospheric pressure, a sufficient potential gradient will be created across the air gap to produce a soft corona glow on the discharge points 12 at that atmospheric pressure, without causing breakdown and disruptive discharge across the air gap. Since the secondary circuit of the transformer, which circuit includes the elements 10 and 11 and the air gap therebetween is connected to the body of the plane at the points indicated by the ground connections 28 static charges accumulating on the body of the plane will be conducted to the high efficiency discharge points 12 and will be rapidly dissipated in the soft corona glow. Upon changes in altitude of the plane during flight and the consequent changes in the barometric pressure, expansion and contraction of the bellows 22 in accordance with these changes will effect a corresponding movement of the target member 11 so as proportionately to increase or decrease the length of the air gap. By properly selecting the location of the pivotal connection 15 between the levers 13 and 17, the length of the air gap may be made to follow the variations of the soft corona glow with the barometric pressure so as to maintain the soft corona glow about the points 12 regardless of variations in the air pressure. Thus, regardless of the altitude at which the plane may be flying, the static suppressor shown in Fig. 1 will insure that accumulations of static charges on the plane will be dissipated in a soft corona glow and will not be discharged from the plane as disruptive static discharges so as to interfere with radio reception.

In the embodiment of the invention shown in Fig. 2, variation of the potential gradient across the air gap between the discharge elements is accomplished not by varying the length of the air gap, but by varying the magnitude of the voltage impressed across the air gap. In this embodiment a pair of fixedly mounted discharge elements 30 and 31 are provided respectively with a plurality of sharp discharge points 32 and 33, and the elements 30 and 31 are directly connected to the opposite terminals of the secondary winding 34 of a suitable high voltage transformer so as to impress the secondary voltage of the transformer directly across the air gap between the discharge elements. As shown, the secondary winding 34 is provided with a mid-tap 35 which is connected by means of a suitable conductor 36 to the plane body, as indicated by the ground connection 37.

In order to effect variations of the secondary voltage applied to the air gap between the elements 30 and 31 and to control this voltage in accordance with variations in the barometric pressure, the primary winding 38 of the high voltage transformer is connected in series circuit relation with a suitable alternator 39 through a variable impedance 40, a conducting arm 41, a bellows 44 and a conductor 46. As shown, the conducting arm 41 is pivoted intermediate its ends on a suitable support 42 and is connected at its other end by means of a pivotal connection 43 to the expansible bellows 44 which is mounted on a fixed support 45 to which the conductor 46 is connected. It will be apparent that upon changes in the barometric pressure, the bellows member 44 will expand or contract so as to move the arm 41 relative to the impedance element 40 and thereby increase or decrease the impedance in series with the primary winding 38 of the transformer. Increasing the external impedance of course decreases the voltage drop across the primary winding 38 of the transformer to effect a proportional change in the secondary voltage and thereby maintain the potential gradient across the air gap at the value necessary to maintain a soft corona glow on the points 32 and 33.

While the variable impedance 40 has been shown as a coil of the type adapted to be engaged by a movable contact arm, it will of course be understood that any suitable variable impedance may be employed, such for example as a solenoid having a movable iron core adapted to be actuated by the expansible bellows 44. In any case the variable impedance must of course be so arranged as to increase the impedance in the primary circuit as the barometric pressure decreases.

In the arrangement shown in Fig. 3, the secondary winding 50 of a suitable high voltage transformer is connected at its opposite terminals to a pair of spaced apart discharge grids or elements 51, which, if desired, may be identical with the discharge elements 30 and 31 of Fig. 2, but which are shown, for purposes of illustration, as comprising suitable fine wires 52 supported at their opposite ends on conducting posts 53. It will of course be understood that the spaced apart discharge elements which form the desired air gap may take any suitable form so long as points or surfaces of high discharge efficiency are presented. In this case the fine wires 52, because of their small diameter, provide a high discharge efficiency comparable with the sharp points 32 and 33 illustrated in Fig. 2. As in the embodiment of Fig. 2, a center tap 54 on the secondary winding 50 is connected by a suitable conductor 55 to the body of the plane which is represented by the ground connection 56.

In this embodiment of the invention the pressure-responsive bellows, such as the elements 22 and 44 of the previously described embodiments, is eliminated and the primary circuit of the high voltage transformer is provided with means for maintaining a substantially constant current flow therein. Thus, as shown in Fig. 3, the primary winding 57 of the high voltage transformer is connected in series circuit relation with a suitable alternator 58 through a variable resistor 59, which is shown as being of the carbon-pile type, and through the primary winding of a suitable current transformer 60.

Bearing on one end of the carbon-pile resistor 59 is a pivoted pressure member 61, one end of which is urged against the resistor 59 by a compression spring 62 adapted to be adjusted by a suitable adjusting screw 63. The opposite end 61a of the pivoted pressure member 61 constitutes the armature of an electro-magnet which is illustrated as comprising a magnetizable core 64 and an energizing winding 65. This energizing winding 65 is connected, as shown, across one pair of terminals of a full wave rectifier 66, the opposite terminals of which are connected across the secondary winding of the current transformer 60.

In this embodiment of the invention the adjusting screw 63 is initially adjusted so as to cause the compression spring 62 to exert on the carbon-pile resistor 59 a sufficient pressure to introduce into the circuit of the primary winding 57 and the alternator 58 a resistance of such magnitude as to insure the flow in this primary circuit of a very small current, whereby the energization of the electromagnet winding 65 is insufficient to actuate the lower end of the pivoted armature 61a. Under these conditions a voltage is induced in the secondary winding 50 so as to impress the desired potential across the discharge grids 51 and produce the desired soft corona glow. The only current flowing in the transformer will be the magnetizing current of the transformer itself and the current necessary to supply the corona loss due to the soft corona glow.

As the plane climbs to higher altitudes and the barometric pressure is thereby reduced, the soft corona glow on the fine wires 52 of the discharge grids 51 tends to increase, which of course tends to increase the current flowing in the secondary circuit. This causes a corresponding increase in the primary circuit, and accordingly the energization of the electromagnet winding 65 is increased through the current transformer 60 and the rectifier 66 so as to exert a force on the pivoted armature 61a and reduce the pressure exerted by the upper end 61 of the armature on the carbon-pile resistor 59. Reducing the pressure on the carbon-pile resistor 59 increases the resistance in circuit with the primary winding 57 and the alternator 58, whereby reducing the current flowing in this primary circuit which likewise tends to reduce the secondary current and restores the soft corona glow to the desired value. Accordingly, by maintaining constant the current flow in the primary circuit it is possible to maintain the desired soft corona glow regardless of variations in the barometric pressure due to changes in the altitude at which the plane is flying. It will of course be understood that the particular constant current system illustrated in Fig. 3 is intended for illustrative purposes only, and any suitable constant current means may be employed in accordance with this invention for maintaining substantially constant the current flowing in the primary circuit.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

Having thus described this invention, what is claimed and desired to be secured by Letters Patent is:

1. A static discharge suppressor for bodies subjected to varying static charges, comprising spaced apart conducting elements electrically connected to said body and forming an air gap, means for impressing an electric potential across said gap to establish a potential gradient thereacross so related to the condition of the air in said gap as to produce a soft corona glow on at least one of said elements whereby static charges on said body are conducted to said one element and dissipated in said soft glow, and means operative under the influence of a change of conditions tending to change said corona glow for varying said potential gradient to maintain said potential gradient at values sufficient to cause said soft corona glow but insufficient to cause disruptive discharges across said gap.

2. A static discharge suppressor for bodies subjected to varying static charges, comprising spaced apart conducting elements electrically connected to said body and forming an air gap, means for impressing an electric potential across said gap to establish a potential gradient thereacross so related to the density of the air in said gap as to produce a soft corona glow on at least one of said elements whereby static charges on said body are conducted to said one element and dissipated in said soft glow, and means automatically operative under the influence of a change of density tending to change said corona glow for varying said potential gradient to maintain a substantially fixed relation between the value of said gradient and said air density, whereby said soft corona glow is maintained at various densities of said air without causing disruptive discharges across said gap.

3. A static discharge suppressor for bodies subjected to varying static charges, comprising spaced apart conducting elements electrically connected to said body and forming an air gap, means for impressing an electric potential across said gap to establish a potential gradient thereacross so related to the density of the air in said gap as to produce a soft corona glow on at least one of said elements whereby static charges on said body are conducted to said one element and dissipated in said soft glow, and means responsive to changes in the barometric pressure for varying said potential gradient to maintain said gradient at values sufficient to cause said soft corona glow but insufficient to cause disruptive discharges across said gap even though said air density varies materially.

4. A static discharge suppressor for bodies subjected to varying static charges, comprising spaced apart conducting elements electrically connected to said body and forming an air gap, means for impressing an electric potential across said gap to establish a potential gradient thereacross so related to the density of the air in said gap as to produce a soft corona glow on at least one of said elements whereby static charges on said body are conducted to said one element and dissipated in said soft glow, and pressure-responsive means for controlling the value of said potential gradient in accordance with changes in the barometric pressure to maintain said soft corona glow and prevent disruptive discharges across said gap.

5. A static discharge suppressor for bodies subjected to varying static charges, comprising spaced apart conducting elements electrically connected to said body and forming an air gap, means for impressing an electric potential across said gap to establish a potential gradient thereacross so related to the density of the air in said gap as to produce a soft corona glow on at least one of said elements whereby static charges on said body are conducted to said one element and dissipated in said soft glow, and pressure-responsive means for varying the length of said gap in accordance with changes in the barometric pressure to maintain said soft corona glow and prevent disruptive discharges across said gap.

6. A static discharge suppressor for bodies subjected to varying static charges, comprising spaced apart conducting elements electrically connected to said body and forming an air gap, means for impressing an electric potential across said gap to establish a potential gradient thereacross so related to the density of the air in said gap as to produce a soft corona glow on at least one of said elements whereby static charges on said body are conducted to said one element and dissipated in said soft glow, and pressure-responsive means for controlling the potential impressed across said gap in accordance with changes in the barometric pressure to maintain said soft corona glow and prevent disruptive discharges across said gap.

7. Means for preventing the occurrence of disruptive static discharges from an airplane subjected in flight to varying static charges, comprising spaced apart discharge elements forming an air gap connected to the body of said plane, means for impressing an electric potential across said gap to create a voltage gradient thereacross of sufficient magnitude to form a soft corona glow on at least one of said discharge elements and insufficient to cause breakdown of said gap, and means for automatically controlling said voltage gradient in response to changes in altitude of said plane in flight to maintain said voltage gradient at the desired value regardless of changes in barometric pressure whereby static charges accumulating on said plane in flight are dissipated in said soft corona glow.

8. Means for preventing the occurrence of disruptive static discharges from an airplane subjected in flight to varying static charges, comprising spaced apart discharge elements forming an air gap connected to the body of said plane, means for impressing an electric potential across said gap to create a voltage gradient thereacross of sufficient magnitude to form a soft corona glow on at least one of said discharge elements and insufficient to cause breakdown of said gap, and pressure-responsive means for varying the length of said gap in response to changes in the barometric pressure during flight of said plane for maintaining a voltage gradient so related to the density of the air in said gap as to maintain said soft corona glow and prevent disruptive discharges by breakdown of said gap, whereby static charges accumulating on said plane in flight are dissipated in said soft glow.

9. Means for preventing the occurrence of disruptive static discharges from an airplane subjected in flight to varying static charges, comprising spaced apart discharge elements forming an air gap connected to the body of said plane, means for impressing an electric potential across said gap to create a voltage gradient thereacross of sufficient magnitude to form a soft corona glow on at least one of said discharge elements and insufficient to cause breakdown of said gap, and pressure-responsive means for varying in accordance with changes in the barometric pressure during flight of said plane the potential impressed across said gap to maintain said soft corona glow without causing disruptive discharges by breakdown of said gap, whereby static charges accumulating on said plane in flight are dissipated in said soft glow.

10. In combination with an airplane subjected in flight to varying static charges, a pair of conducting members mounted in spaced apart relation to form an air gap, at least one of said members being shaped to provide discharge surfaces of high efficiency, transformer means having primary and secondary circuits, means connecting said members and said air gap in said transformer secondary circuit, means for energizing said primary circuit to impress across said air gap the voltage of said transformer secondary circuit and establish a voltage gradient thereacross of sufficient magnitude to form a soft corona glow on said discharge surfaces, means operative under the influence of a change of conditions tending to change said corona glow for varying the effective voltage gradient across said air gap to maintain said soft corona glow and prevent disruptive discharges across said gap, and means for connecting a point in said secondary circuit to the body of said plane whereby static charges accumulating on said plane are conducted to said discharge surfaces and dissipated in said soft corona glow.

11. In combination with an airplane subjected in flight to varying static charges, a pair of conducting members mounted in spaced apart relation to form an air gap, at least one of said members being shaped to provide discharge surfaces of high efficiency, transformer means having primary and secondary circuits, means connecting said members and said air gap in said transformer secondary circuit, means for energizing said primary circuit to impress across said air gap the voltage of said transformer secondary circuit and establish a voltage gradient thereacross of sufficient magnitude to form a soft corona glow on said discharge surfaces, pressure-responsive means for effecting relative movement of said conducting members to vary the length of said gap in accordance with changes in the barometric pressure during flight of said plane and maintain said soft corona glow while preventing disruptive discharges across said gap, and means for connecting a point in said secondary circuit to the body of said plane whereby static charges accumulating on said plane in flight are conducted to said discharge surfaces and dissipated in said soft corona glow.

12. In combination with an airplane subjected in flight to varying static charges, a pair of conducting members mounted in spaced apart relation to form an air gap, at least one of said members being shaped to provide discharge surfaces of high efficiency, transformer means having primary and secondary circuits, means connecting said members and said air gap in said transformer secondary circuit, means for energizing said primary circuit to impress across said air gap the voltage of said transformer secondary circuit and establish a voltage gradient thereacross of sufficient magnitude to form a soft corona glow on said discharge surfaces, pressure-responsive means for varying the magnitude of the voltage impressed across said gap in accordance with changes in the barometric pressure during flight of said plane to maintain said soft corona glow and prevent disruptive discharges across said gap, and means connecting a point in said secondary circuit to the body of said plane whereby static charges accumulating on said plane are conducted to said discharge surfaces and dissipated in said soft corona glow.

13. In combination with an airplane subjected in flight to varying static charges, a pair of conducting members mounted in spaced apart relation to form an air gap, at least one of said members being shaped to provide discharge surfaces of high efficiency, transformer means having primary and secondary circuits, means connecting said members and said air gap in said transformer secondary circuit, means for energizing said primary circuit to impress across said air gap the voltage of said transformer secondary circuit and establish a voltage gradient thereacross of sufficient magnitude to form a soft corona glow on said discharge surfaces, means operative under the influence of a change of conditions tending to change said corona glow for controlling said primary circuit to vary the voltage of said secondary circuit to maintain said soft corona glow and prevent disruptive discharges across said gap, and means connecting a point in said secondary circuit to the body of said plane whereby static charges accumulating on said plane are conducted to said discharge surfaces and dissipated in said soft corona glow.

14. A static discharge suppressor for bodies subjected to varying static charges, comprising spaced apart conducting elements electrically connected to said body and forming an air gap, means for impressing an electric potential across said gap to establish a potential gradient thereacross so related to the density of the air in said gap as to produce a soft corona glow on at least one of said elements whereby static charges on said body are conducted to said one element and dissipated in said soft glow, and means automatically operative under the influence of a change of conditions tending to change said corona glow for maintaining substantially constant the current flow to said conducting elements to prevent disruptive discharges across said gap and to maintain said soft corona glow.

15. In combination with an airplane subjected in flight to varying static charges, a pair of conducting members mounted in spaced apart relation to form an air gap, at least one of said members being shaped to provide discharge surfaces of high efficiency, a source of electric potential, means connecting said members and said air gap in circuit with said source to establish across said gap a voltage gradient of sufficient magnitude to form a soft corona glow on said discharge surfaces, means automatically operative under the influence of a change of conditions tending to change said corona glow for maintaining substantially constant the current flowing in said circuit to prevent disruptive discharges across said gap and to maintain said soft corona glow, and means connecting a point in said circuit to the body of said plane whereby static charges accumulating on said plane are conducted to said discharge surfaces and dissipated in said soft corona glow.

16. In combination with an airplane subjected in flight to varying static charges, a pair of conducting members mounted in spaced apart relation to form an air gap, at least one of said members being shaped to provide discharge surfaces of high efficiency, transformer means having primary and secondary circuits, means connecting said members and said air gap in said transformer secondary circuit, means for energizing said primary circuit to impress across said air gap the voltage of said transformer secondary circuit and establish a voltage gradient thereacross of sufficient magnitude to form a soft corona glow on said discharge surfaces, means automatically operative under the influence of a change of conditions tending to change said corona glow for maintaining substantially constant the current flowing in said primary circuit to prevent disruptive discharges across said gap and to maintain said soft corona glow, and means for connecting a point in said secondary circuit to the body of said plane whereby static charges accumulating on said plane are conducted to said discharge surfaces and dissipated in said soft corona glow.

17. A static suppressor for an airplane subjected in flight to varying static charges, comprising a discharge element having a plurality of discharge points, a conducting member spaced from said points to form a target, means for impressing an alternating potential across the gap between said points and said target to cause a soft corona glow on said points, means connecting said discharge element to the body of said plane whereby charges accumulating on said plane are conducted to said points and dissipated in said soft corona glow, and pressure-responsive means for effecting relative movement between said target and said points in response to changes in the barometric pressure as said plane changes altitude to maintain said soft glow and prevent disruptive discharges between said points and said target.

18. A static suppressor for an airplane subjected in flight to varying static charges, comprising a pair of discharge elements mounted in spaced apart relation to form an air gap, an energizing transformer having a secondary winding connected across said elements and a primary winding, means for supplying alternating current to said primary winding to energize said secondary winding and establish an alternating potential gradient across said gap of a magnitude sufficient to form a soft corona glow on said elements but insufficient to cause disruptive discharges across said gap, means operative under the influence of a change of conditions tending to change said corona glow for controlling the energization of said primary winding to vary said potential gradient, and means connecting the midpoint of said secondary winding to the body of said plane whereby charges accumulating on said plane are conducted to said discharge elements and dissipated in said soft corona glow.

19. In combination with an airplane subjected in flight to varying static charges, a pair of conducting members mounted in spaced apart relation to form an air gap, at least one of said members being shaped to provide discharge surfaces of high efficiency, a source of electric potential, means connecting said members and said air gap in circuit with said source to establish across said gap a voltage gradient of sufficient magnitude to form a soft corona glow on said discharge surfaces, constant current means in said circuit operative under the influence of the current flowing in said circuit for maintaining said current substantially constant to prevent disruptive discharges across said gap and to maintain said soft corona glow, and means connecting a point in said circuit to the body of said plane whereby static charges accumulating on said plane are conducted to said discharge surfaces and dissipated in said soft corona glow.

20. A static suppressor for an airplane subjected in flight to varying static charges, comprising a pair of discharge elements mounted in spaced apart relation to form an air gap, an energizing transformer having a secondary winding connected across said elements and a primary winding, means for supplying alternating current to said primary winding to energize said secondary winding and establish an alternating potential gradient across said gap of a magnitude sufficient to form a soft corona glow on said elements but insufficient to cause disruptive discharges across said gap, constant current means in the primary circuit of said transformer automatically operative under the influence of the current flowing in said primary circuit for maintaining said current substantially constant, and means connecting the midpoint of said secondary winding to the body of said plane whereby charges accumulating on said plane are conducted to said discharge elements and dissipated in said soft corona glow.

PETER C. SANDRETTO.